United States Patent
Alvino

(10) Patent No.: US 9,670,912 B2
(45) Date of Patent: Jun. 6, 2017

(54) ELECTRIC POWER GENERATION SYSTEM FOR ROADWAY USE

(71) Applicant: Frank J. Alvino, Vero Beach, FL (US)

(72) Inventor: Frank J. Alvino, Vero Beach, FL (US)

( * ) Notice: Subject to any disclaimer, the term of this patent is extended or adjusted under 35 U.S.C. 154(b) by 93 days.

(21) Appl. No.: 14/605,031

(22) Filed: Jan. 26, 2015

(65) Prior Publication Data

US 2015/0211498 A1  Jul. 30, 2015

Related U.S. Application Data

(60) Provisional application No. 61/931,843, filed on Jan. 27, 2014.

(51) Int. Cl.
*F04B 17/00* (2006.01)
*F03G 7/08* (2006.01)
*F03G 7/00* (2006.01)

(52) U.S. Cl.
CPC ............... *F03G 7/08* (2013.01); *F03G 7/00* (2013.01); *F04B 17/00* (2013.01)

(58) Field of Classification Search
CPC .............. F03G 7/08; F03G 7/00; F04B 17/00
USPC .................................. 290/1 R, 1 C
See application file for complete search history.

(56) References Cited

U.S. PATENT DOCUMENTS

| | | | | |
|---|---|---|---|---|
| 4,437,015 A * | 3/1984 | Rosenblum | ............ | F03G 7/08 290/1 R |
| 5,355,674 A * | 10/1994 | Rosenberg | ............ | F03G 3/00 290/1 R |
| 6,172,426 B1 * | 1/2001 | Galich | ............ | F03G 7/08 290/1 R |
| 6,376,925 B1 * | 4/2002 | Galich | ............ | F03G 7/08 290/1 R |
| 7,530,760 B2 * | 5/2009 | Rastegar | ............ | E01C 9/007 290/1 R |
| 2005/0200132 A1 * | 9/2005 | Kenney | ............ | F04B 17/00 290/1 R |
| 2006/0006653 A1 * | 1/2006 | Ricketts | ............ | F03G 7/08 290/1 R |
| 2007/0085342 A1 * | 4/2007 | Horianopoulos | ............ | F03G 7/08 290/1 R |
| 2008/0106103 A1 * | 5/2008 | Owens | ............ | H02K 7/1853 290/1 R |
| 2008/0157537 A1 * | 7/2008 | Richard | ............ | H02K 7/1876 290/1 R |
| 2009/0179433 A1 * | 7/2009 | Kenney | ............ | F01D 17/26 290/1 R |

(Continued)

*Primary Examiner* — Tho D Ta
(74) *Attorney, Agent, or Firm* — Ladas + Parry LLP

(57) ABSTRACT

A hydraulic electric power generation system for roadway installation has a plurality of fluid-filled compressible pump channels positioned for compression by a vehicle to drive the fluid in a channel outwardly through outlet sides of the channels. The channels are contained in a mat adapted for positioning of a roadway surface in a manner such that the channels are compressed by the tires of vehicles travelling on the roadway. An outlet manifold collected the fluid driven out through the outlet sides of the channels and directs it to through piping to a hydraulic motor and coupled electric generator. The fluid exiting from the motor passes to a sump, from which it can be returned to a mat manifold at inlet sides of the channels. The channels are provided with one-way valves to prevent backflow.

14 Claims, 4 Drawing Sheets

(56) References Cited

U.S. PATENT DOCUMENTS

| | | | |
|---|---|---|---|
| 2010/0198412 A1* | 8/2010 | Hendrickson | F15B 13/04 |
| | | | 700/275 |
| 2011/0148121 A1* | 6/2011 | Kenney | F03G 7/08 |
| | | | 290/1 R |
| 2012/0211996 A1* | 8/2012 | Jang | F03G 7/08 |
| | | | 290/1 R |
| 2013/0009398 A1* | 1/2013 | Behnia | F03G 7/08 |
| | | | 290/52 |

* cited by examiner

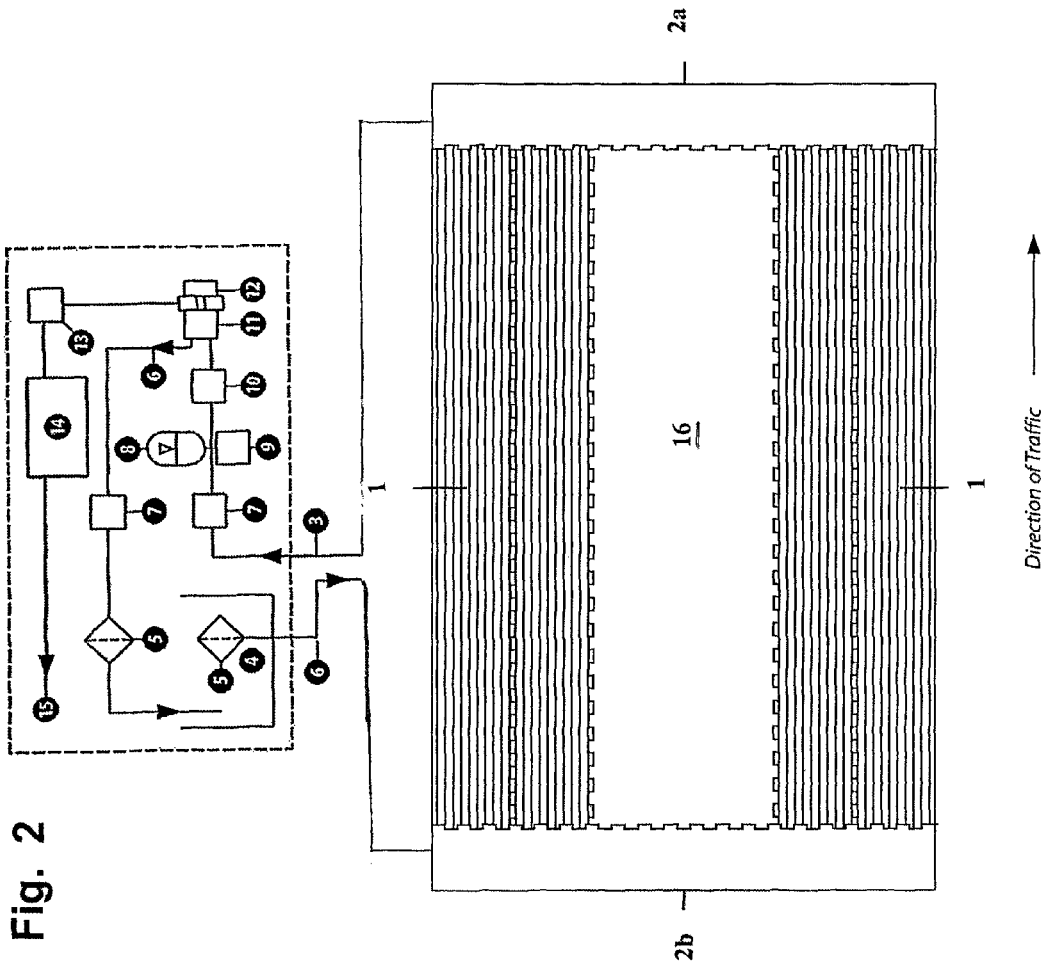

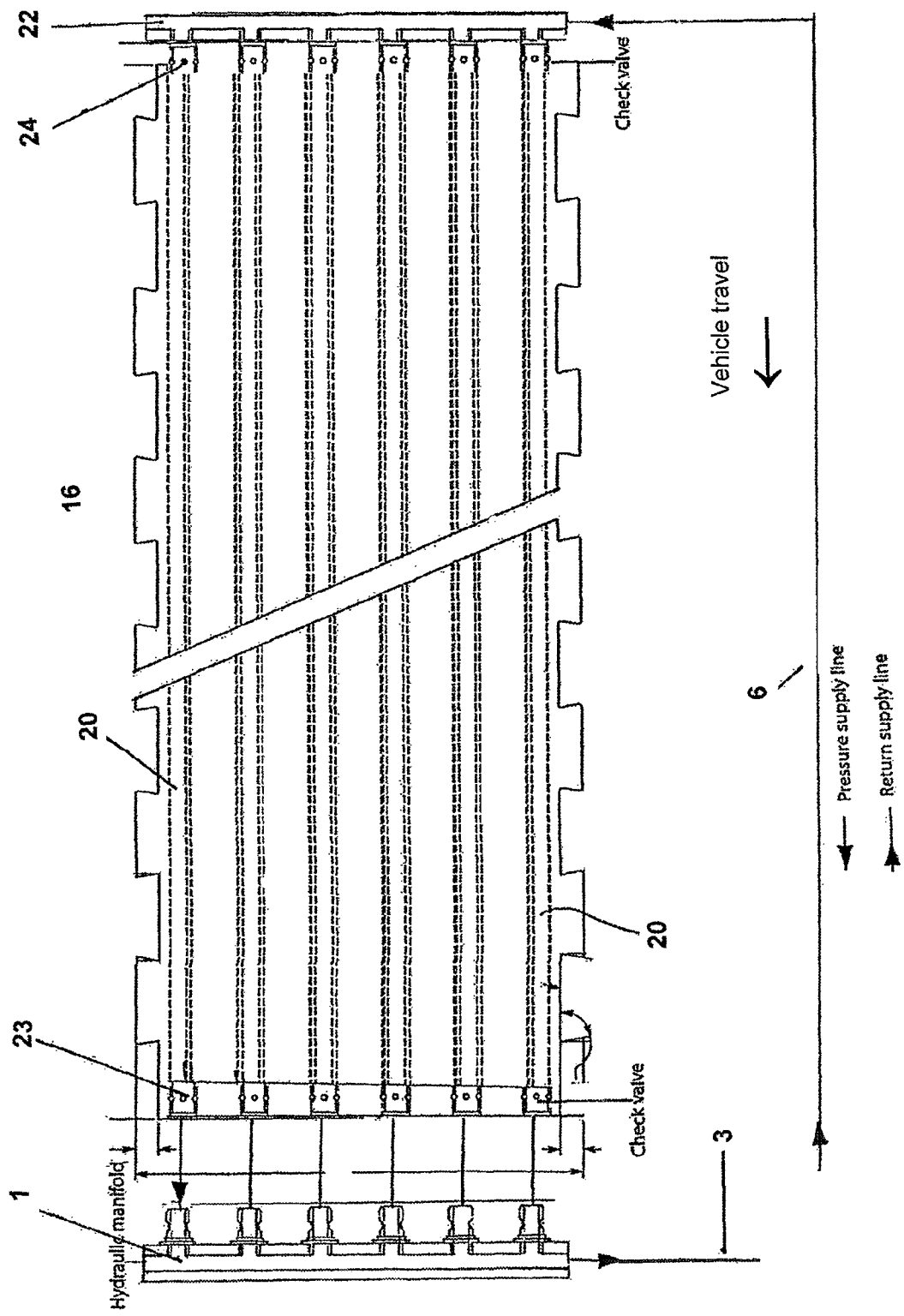

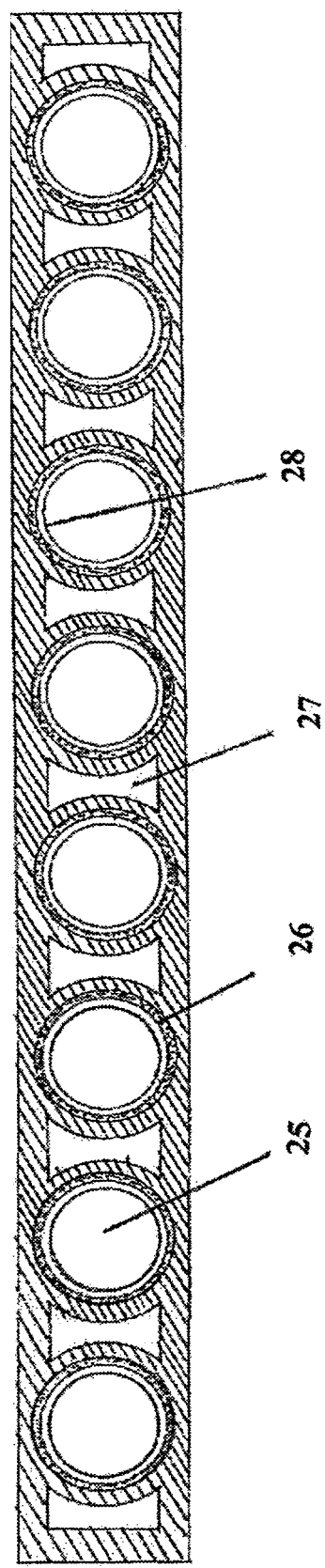

ELECTRIC POWER GENERATION SYSTEM FOR ROADWAY USE

The present invention is directed to a hydraulically-driven electrical generation system which generates electrical energy as a by-product of the motion of a vehicle traveling along a roadway.

BACKGROUND OF THE INVENTION

Renewable (self-sustaining) energy is one of the most read about and discussed topics in the world. It encompasses many different alternative energy sources, e.g., solar, wind, hydro, tidal, nuclear, biomass, geothermal and, more recently, kinetic energy produced from moving cars. Renewable energy sources, when compared to conventional fossil fuel energy sources such as oil, coal and gas, have substantial advantages. Yet, they can be difficult and often expensive to harness, and a large amount of such an energy source is typically needed to produce only a small amount of useful electrical or fuel energy. The generation and utilization of renewable energy often poses environmental challenges, requires new infrastructure and enormous investments before generating revenue. As a result, the alternative energy industry has been slow to develop, despite government spending, regulations and policies to support its growth.

In contrast, oil, coal and gas are efficient energy sources and small amounts can produce or be used to produce relatively large amounts of electrical or fuel energy. Fossil fuel energy has a massive established base and continues to comprise the easiest and least expensive obtainable energy source. As a result, fossil fuels will likely remain the world's predominant sources of energy for the next several decades. Climate change concerns, high price swings in the cost of oil and increasing government support, however, will continue to drive renewable energy legislation, incentives and commercialization despite the problems each face with technology, public acceptance and economic viability. More importantly, there remains an opportunity to develop a broader mix of practical and economical renewable energy sources if future global needs are to be met.

In the United States alone, traffic flow along the nation's roads represents a significant, stable source of kinetic energy associated with such motion. The U.S. Energy Information Administration (EIA) reports that there are 55,650,943 paved roads in the United States totaling nearly 3.9 million miles of roadway. The total U.S. vehicle stock comprises some 255 million registered vehicles, with residential vehicles accounting for 83% of the total. Nonresidential vehicles, comprising business fleets and government operated vehicles (federal, state, county, and municipal governments) account for 17% of the total. According to the latest available annual survey, U.S. residential vehicles traveled 1,793 billion miles. In terms of total traffic, the average mile of roadway was traversed by residential and non-residential vehicles 1,557 times per day. On high traffic toll and non-toll roads, including highways and interstate segments, there substantially more total traffic per mile of roadway—between 45,000 and 65,000 vehicles on an average day. The harnessing of even a miniscule portion of the energy from such traffic flow, particularly in these high traffic areas, could position this energy source to compete with other forms of alternative energy such as wind and solar by reducing the variability.

BRIEF DESCRIPTION OF THE INVENTION

The present invention utilizes vehicle traffic moving along a roadway to generate electricity. The invention incorporates several important features which distinguish it from other systems and methodologies described in prior disclosures and patents. It also addresses specific shortcomings in the following areas:
 1. Design and Structure
 2. Installation and Placement
 3. Cost and Commercial Practicality The prior art discloses a multitude of roadway power conversion systems to tap the energy of moving vehicles. Common to these disclosures is the complexity of the energy conversion systems. Almost all embodiments (a) include a plurality of complex components, mechanisms, cylinders, pistons, springs, coils, magnets and assemblies; (b) require that they be embedded or installed in encasements or containment systems located below the roadway surface; (c) include numerous mechanical actuators, contact members or projections which protrude or extend above the road surface to activate the system, and (d) utilize roadway platforms, pads or pressure receiving plates to cover the numerous contact members and/or otherwise serve to impede traffic flow. These power schemes are expensive to manufacture, install and maintain and they are often vulnerable to extreme weather.

In contradistinction to such designs, the present invention preferably utilizes a practical and relatively inexpensive fluid system to convert vehicle motion to electric to power. Pneumatic systems can be considered as an alternative, but pneumatic systems are low pressure systems and issues with compliance (compressibility) may limit their applicability in the invention. While a variety of fluids may be used, water hydraulics combine the high power density of hydraulics and the clean operation of pneumatics without the need for expensive, complex hardware and concerns associated with the use of other hydraulic fluids.

Water hydraulic technologies have rapidly advanced to become viable and attractive solutions in many fluid power applications. The limited-compressibility and inherent cleanliness of water allows it to be used in many applications, particularly in this invention, where conventional hydraulic fluids are undesirable. Because its viscosity is significantly lower than oil, water can transmit comparable power with lower pressure differentials. It exhibits less decompression shock, resulting in less system fatigue. A water-based hydraulic drive system thus offers greater efficiencies over oil systems, thereby reducing operational costs, the size of components and high rotary power for a given output. The virtual incompressibility of water also offers excellent controllability with rapid response. The main technical challenges, including leakage and erosion, can be addressed cost-effectively.

A water based hydraulic systems employs all of the basic types of components seen in conventional hydraulic systems, i.e., pumps, motors, cylinders, valves, filters and reservoirs. These components, however, are designed to endure the particular operating conditions wrought by the introduction of water. Special materials-stainless steel, ceramics, and various synthetics combine with tighter component tolerances to produce systems that match the performance of conventional hydraulics. A small percentage of low-cost and environmentally-friendly additives, such as glycol may be used to allow a water-based system to operate effectively under a variety of extreme conditions such as low temperatures.

The present invention comprises three main elements:
 1. A low-profile substantially flat elastomeric array of compression channels which serves as a positive displacement hydraulic pump system operated by the downward forces of tires making contact with the mat.
2. Manifold assemblies which consolidate the inlet and outlets of the individual compression channels in a mat to provide a more consistent fluid flow and pressure.
3. A hydraulic motor connected to and driven by the fluid flow generated by the pump system. The motor is coupled to a rotary electric generator.

Depending on the specific embodiment, manifolds, valves, accumulators, filters and piping may be incorporated to guide, control and interconnect the hydraulic pump, manifold and motor. The hydraulic pump and motor may be plumbed for open-circuit unidirectional operation.

The low-profile flat surfaced elastomeric hydraulic pump array of the invention may be in the form of a mat and is positioned on the roadway surface or other surface upon which vehicles travel. To the extent that the array rises above the road grade, ultra-low (<5 degrees grade) on/off ramps may be provided to allow vehicles to smoothly enter upon and return from the array. The array can also be installed at grade level without the need for ramps. The pump array generates a flow of pressurized fluid that is delivered to and drives the hydraulic motor. A plurality of mats may be interconnected to increase the flow of the hydraulic fluid. The motor, which has an output shaft, produces rotary torque which drives the electric generator or alternator. The generated electrical power may be stored or converted to an appropriate form for utilization. The placement of a series of the invention's hydraulic pump arrays along a roadway can create a continuous fluid flow resulting from traffic flow and allow the production of a significant amount of electrical power in an environmental friendly manner.

With the exception of the electric generator, the entire hydraulic drive system, including the hydraulic pump, hydraulic motor, manifolds, valves, accumulators, filters and piping, etc. is preferably designed to use a water-based fluid as the working fluid. The water-based fluid also serves as its only needed lubricant and coolant for the system. It is within contemplation that other fluids can also be used.

BRIEF DESCRIPTION OF THE DRAWINGS

A fuller understanding of the invention will be obtained upon review of the following detailed description thereof, taken in association with the annexed drawings, wherein:

FIG. 2 is a schematic depiction of the individual components and assembly of the invention;

FIG. 3 is a representation of an interlocking panel of the hydraulic pump; and

FIG. 4 is a cross-sectional illustration of a mat panel.

DETAILED DESCRIPTION OF THE INVENTION

Figure 1:
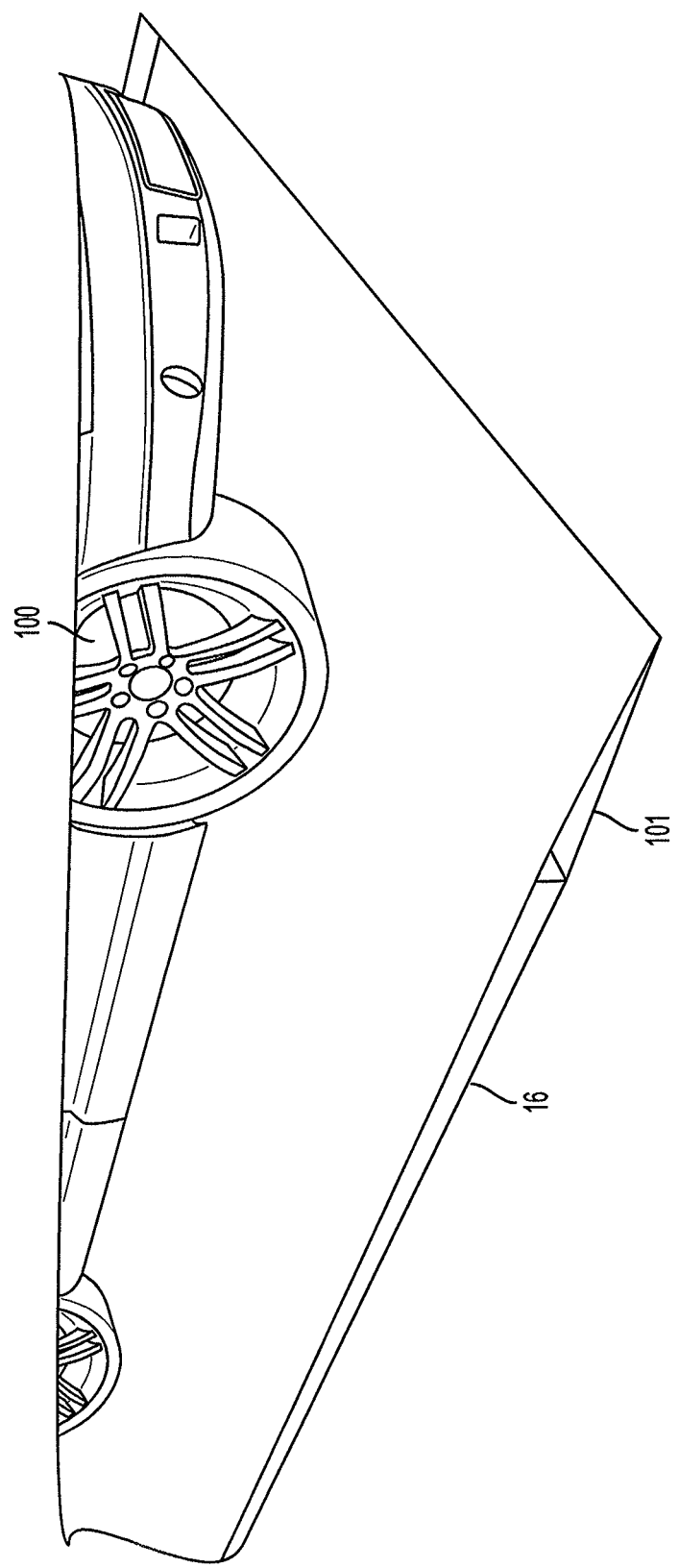
FIG. 1 is an illustration of a pump array of the invention installed on a roadway.

With initial reference to FIG. 1, a hydraulically-driven electric generation system of the present invention includes one or more interlocking mat panels 16 aligned to be overridden by the wheels of vehicles 100 traveling along the roadway upon which the mats are installed. A mat may be provided with entrance and exit ramps 101 to ease the transition of the vehicle to and from the mat. With further reference to FIGS. 2 and 3, each mat has one or more multi-channel design hydraulic pumps 1 and a pair of outlet and inlet manifolds 2a, 2b running along opposed edges of the mat to which the pump channels in the mat are connected. Each channel has a check valve at each end to prevent backflow. The outlet manifold 2a is connected by piping 3 to an accumulator 8 that buffers and modulates the pressure pulses and fluid flow generated by the pumps, and then to a hydraulic motor 11 which is coupled to a rotary electro-magnetic generator 12. The fluid flow from the motor 11 passes into a reservoir or sump 4, which returns the fluid to the mat through return supply line 6 connected to the inlet manifold 2a. While it is presently contemplated that the sump be open and unpressurized, a closed or pressurized reservoir may also be used to assist return of the fluid to the mat.

As further seen in FIG. 3, each mat has a set of water or otherwise fluid-filled channels 20 running along the direction of vehicle travel. As vehicles move over the mats, the tires overlie one or more of the channels. The compressive force of the tires compresses and occludes the walls of the channels, the point of occlusion following the travel of the vehicle and its tires along the length of the channels, squeezing the fluid ahead of the occlusion forward in the direction of the travelling occlusion. The fluid in the channel being compressed is driven forwardly through and out of the channel and through the outlet manifold 21 where it consolidates with the likewise-generated flows from other channels being compressed by the same or other vehicle tires. A one-way check valve 23 is associated with each channel on the outlet side, to allow the water to be exhausted from the channels due to the applied tire force into the manifold 21 but not to flow back into the channel from the manifold when tire force is removed. A series of second one-way valves 24, configured to allow fluid flow into the mat channels, is positioned at the opposite, inlet sides of the channels, allowing fluid to be drawn into the channels from the return manifold 22 as a result of the negative pressure gradient caused by the rebound of the channel walls as they return to their original shape as the tire passes. The refill water is supplied from the open-circuit reservoir 4 (FIG. 2) through return line 6. The one-way valves on the return supply line allow the channels to be refilled with fluid concurrently with the travel of a tire along the mat to self-prime for the next tire contact cycle while preventing any backflow into the return line from the channels. As a tire rolls along the length of a channel (from right to left in FIG. 3), the water in the channel lying to the left of the tire contact patch is forced by the tire to exit through the outlet manifold 21 while at the same time the rebound of the channel directly behind the tire draws in refill water from inlet manifold 22. The one way valves 23 on the outlet sides prevent water from a channel flowing into manifold 21 from entering another channel.

The fluid flow from each of the ganged channels in a mat is collected in the outlet manifold 21 to provide a single consolidated flow. In a like manner, a plurality of mats can be ganged together through their respective manifolds to provide an increased flow level and rate to the hydraulic motor. The combined flow is directed to hydraulic accumulator 7, enabling the accumulator to charge, and once charged, to assist in maintaining a more consistent flow through the system and to the hydraulic motor 11. The accumulator takes a specific amount of the driven fluid generated by the pump system and stores the fluid under pressure. A check valve 7 on the pressure supply line between the mat pumps and the accumulator inlet prevents backflow to the mats between cycles. As known in the art, the accumulator serves as a means for absorbing flow that is in excess of that which the motor-generator pair 11, 12 can utilize and provides a flow to the motor for some interval when the pulse or flow rate from the mats drops. When required, it releases fluid into the hydraulic circuit to add to the pump flow. The accumulator may enable the hydraulic system to cope with variations in traffic flow across the mats and to maintain a minimum operating flow in times of low traffic density. Depending on the volume capacity of the accumulator, a major benefit of the accumulator can be the additional energy that can be stored for use while the pumps are subject to off-peak hours of traffic. The open circuit design, where mat refill is based on mat rebound, enables the pump system to provide a continuous flow and recharge of hydraulic fluid without the need for auxiliary power to recharge the pumps.

The mats preferably comprise a low profile flat surfaced elastomeric construction, having multiple parallel pressure channels that are oriented parallel to the direction of traffic flow. The mat is constructed of an appropriate elastomeric material that allows the channels to be compressed and occluded when external pressure is applied to the mat, and specifically when the vertical contact force of rolling tires traveling along the road surface on which the mat lies is directed through the road "contact patch" (the tire surface area where the tire meets the road) along the length of a mat channel. In one embodiment, it is contemplated that the width of the mat will correspond to the width of a lane of the roadway or vehicle path upon which the mat is installed, with the channels being located and spaced across the width of the mat (as illustrated in FIG. 2) to be contacted by tires on both sides of the vehicles rolling over the mat. Alternatively, two separate mats may be positioned along opposite sides of a lane, such that each mat is located for contact by either the right or left side wheels of a vehicle. As a further alternative a mat may extend across the full extent of a lane, but have separated sets of channels positioned for contact respectively with right and left side tires.

As depicted in FIG. 4, the channels 25 may be circular in cross-section, with walls formed of the mat composition and including a reinforcement layer or ring 26 surrounding an inner liner 28 for the channel to provide the needed response characteristics to permit compression and occlusion of the channel and prompt rebound. The mat may be provided with internal or externally-vented grooves or slots 27 between the channels, to further facilitate compression of the mat as the tires roll over the mat and rebound thereafter. Other cross-sectional profiles may also be used, with the goal of providing efficient conversion of the force generated by the tires upon the mat into a compressive force to deform and occlude the channels and generate the desired fluid flow to drive the hydraulic motor. The design is important, since the contact patch has to overcome the hoop strength of the channel and fluid pressure to insure complete closure of the channel. Conversely, the channel must have sufficient resiliency to enable its recovery (restitution) to generate sufficient negative pressure or suction needed for refill. Recovery may be significantly influenced by the construction of the reinforcement layers of the channel walls. In short, they must have an elastic quality that permits the channels to be compressed and spring back to their original shape in high frequency cycles. The overall efficiency of a channel pump depends on the following parameters: (a) occlusion or the amount of compression resulting from the downward force of the tire; (b) cross-section or internal diameter of the channel; and (3) length of the channel. Design factors to be considered may include (a) maximization of the occlusion of the channels; (b) compression and recovery lag at various (or intended) roadway speeds; and (c) incorporation of a cushioning effect or the like to minimize any vibration or movement that may be felt by drivers crossing over the mat surface.

In that regard, a presently contemplated embodiment of the invention provides for installation of the mats on roadway surfaces where vehicle deceleration is required, such as intersections with traffic lights, at the entranceway to toll booths or rest areas, parking areas, garages and the like, such that a portion of the required dissipation of the kinetic energy of the vehicle's forward motion that normally is converted to and lost through brake heat during standard braking action is instead used to compress the channels.

While the power and fluid flow generated by each individual pressure channel may be small, the presence of a plurality of pressure channels and the constant generation of flow by a plurality of channels in multiple mats developed through a constant traffic flow over the mats can result in a significant fluid flow and a meaningful amount of electric power being generated and captured. The output current from the electro-magnetic generator 12 is collected and processed by appropriate circuitry to be fed directly into distribution, or preferably processed and stored by an appropriate storage device, such as a chargeable battery or capacitor, for use as desired.

Existing disclosures describe various roadway-embedded constructions and assemblies to drive power conversions. As noted earlier in this disclosure, the design and structure of these devices typically require that they be installed beneath a road surface, i.e., between the road bed and roadway pavement or surface and utilize various types and forms of actuators which extend above the roadway surface to activate or engage the system. The present invention, which comprises low profile elastomeric surface mounted mats, can be installed flat on any road surface and sited on location without being intrusive or requiring extensive retrofitting or modification of the roadway. The elastomeric material may consist of a rubber composition which provides a contact surface and deformation and recovery characteristics under high frequency cycles appropriate for contact with vehicle tire tread rubber to minimize rolling resistance while maintaining steering and braking stability of the vehicles. It also should provide high fatigue resistance, prolonged flex life, stability at high temperatures and abrasion resistance. The provision of such appropriate characteristics may be most easily met when the mats are sited at locations in which vehicle speed is not excessive, i.e., lower speed, less friction, lower temperatures and particularly in locations of the type mentioned above where speed decreases and braking is expected or required.

The mats are preferably constructed of an all-weather, abrasive resistant natural or synthetic rubber formulation as may be known to withstand heavy traffic, extreme weather and to provide UV protection, all of which are required for different operating environments and roadway conditions. The mats can be manufactured inexpensively using conventional casting, molding or extrusion processes.

The composition and flexibility of the mats should allow them to naturally lay flat, which provides the significant benefit of easy and inexpensive installation on various road surfaces, i.e., asphalt or concrete, without the need for costly and disruptive roadwork which is required to install other generator devices. Multiple mats may be laid sequentially along a roadway as desired, either individually connected to a series of generators, or ganged into a single system. A proper polymer compound should enable the mats to be constructed in various sizes to accommodate single or multiple lane requirements, specific application and location requirements, with consideration of energy production demands and traffic patterns and flow. A typical mat may have a minimum width of 12 feet, which is the U.S. Highway System's standard for a lane, and a minimum length of 16 feet to accommodate larger residential vehicles, i.e., vehicles longer than 180 inches, whereby the front and rear contact patch of each tire of multiple axles of the vehicle can engage the mat simultaneously for some interval of passage. However, when a sequence of mats is provided, flow outputs from the channels in a plurality of mats may be combined as required. The mats may be easily anchored or secured to the roadway with simple surface mounting hardware or adhesive. A single mat as installed may be a unitary construction, or may itself comprise a series of joined smaller mat units.

The present invention is a stand-alone system which is compact in design, can be sited on location and easily integrated into existing roadway systems. The structure and design of the invention is based upon simple mechanical properties and practical engineering aspects and provide economies of cost of manufacture and installation, with improved in-service reliability and low maintenance requirements. The invention can be easily installed at high traffic locations for maximum output and can be used, for example, to power roadway signs, signals, cameras, street lights, cell towers and EV charge stations. It may be particularly suited for use in remote areas if the traffic flow is sufficient. It is cost effective, with years of reliable performance with low maintenance, and can be manufactured in various sizes to meet power needs for different applications. For relatively low-power uses, on-site installations located at the point of consumption may be particularly favorable, as such installations can be relatively small in scope and will eliminate transmission and distribution costs from remote power generation sites.

In addition to the generation of electric power, another unique feature of the present invention is its ability to perform "watch dog" support by providing a mechanism for taking multiple measurements through the incorporation of simple sensors. Through the provision of sensors responsive to traffic flow, traffic conditions can be monitored and reported remotely through appropriate data links. Other sensors can be installed to monitor and report operating conditions of the system, such as temperature, flow rates, discharge pressures, power output, etc.

I claim:

1. A hydraulic electric power generation system for roadway installation, comprising:
    a mat having a plurality of fully fluid-filled compressible parallel pump channels positioned for compression by a vehicle tire to drive the fluid in a the channels outwardly through outlet sides of the channels, the channels each being adapted and configured to fully compress into a closed position at a location overlain by the tire to generate a driving exiting force for the fluid between the fully compressed location and the outlet side of the channel and to return to a fully open position when not overlain by the tire to produce a reduced pressure condition in the channel to draw fluid through an inlet side of the channel as the channel returns to the fully open position, the channels being circular in cross-section, separated by internally or externally-vented grooves or slots in the mat and having walls including a reinforcement layer surrounding an inner liner;
    an outlet manifold for collecting the fluid driven through the outlet sides of the channels; and
    a hydraulic motor and coupled electric generator connected by piping to the outlet manifold, the hydraulic motor being driven by a flow of the collected fluid driven from the channels.

2. The system of claim 1 wherein the mat is adapted to sit upon an upper surface of a vehicle-traversing roadway.

3. The system of claim 1 wherein the pump channels are oriented to extend in a direction of vehicle travel on the roadway.

4. The system of claim 1, further comprising a sump for collecting fluid from the channels exiting from the hydraulic motor.

5. The system of claim 4, wherein the sump has an outlet for returning collected fluid to inlet sides of the channels through an inlet manifold.

6. The system of claim 5, wherein each of the plurality of fluid channels has one way valves associated with its inlet and outlet sides to prevent backflow of fluid.

7. The system of claim 6 wherein the mat is adapted to sit upon an upper surface of a vehicle-traversing roadway.

8. The system of claim 7 wherein the pump channels are oriented to extend in a direction of vehicle travel on the roadway.

9. The system of claim 7 comprising a plurality of mats, each adapted to be interconnected with one or more other of the mats, the outlet manifolds of all the interconnected mats being operatively joined together and the inlet manifolds of all the mats being operatively joined together.

10. The system of claim 7 wherein the mat comprises two spaced pluralities of pump channels, the outlet and inlet manifolds of the two pluralities being respectively operatively connected.

11. The system of claim 1, further comprising a sump for collecting fluid from the channels exiting from the hydraulic motor, the sump having an outlet for returning collected fluid to inlet sides of the channels through an inlet manifold.

12. The system of claim 11, wherein each of the plurality of fluid channels has one way valves associated with its inlet and outlet sides to prevent backflow of fluid.

13. The system of claim 11 comprising a plurality of mats, each adapted to be interconnected with one or more other of the mats, the outlet manifolds of all the interconnected mats being operatively joined together and the inlet manifolds of all the mats being operatively joined together.

14. The system of claim 11 wherein the mat comprises two spaced pluralities of pump channels, the outlet and inlet manifolds of the two pluralities being respectively operatively connected.

* * * * *